United States Patent [19]

Kinderman et al.

[11] 4,226,927

[45] Oct. 7, 1980

[54] PHOTOGRAPHIC SPEED TRANSFER ELEMENT WITH OXIDIZED POLYETHYLENE STRIPPING LAYER

[75] Inventors: Gerard H. Kinderman; Robert L. Rutledge, both of St. Paul; Ronald S. Steelman, Oakdale, all of Minn.

[73] Assignee: Minnesota Mining and Manufacturing Company, St. Paul, Minn.

[21] Appl. No.: 904,547

[22] Filed: May 10, 1978

[51] Int. Cl.[3] .................... G03C 1/90; B65D 65/28; B32B 3/06; B32B 3/00

[52] U.S. Cl. .................... 430/14; 428/43; 428/101; 428/195; 428/914; 430/263

[58] Field of Search .................... 96/76 R, 83, 119 R; 428/914, 195, 101, 43; 430/14, 263

[56] References Cited

U.S. PATENT DOCUMENTS

| | | | |
|---|---|---|---|
| 2,326,058 | 8/1943 | Nadeau | 96/83 |
| 2,409,564 | 10/1946 | Heinecke et al. | 96/83 |
| 2,544,237 | 3/1951 | Reese | 96/83 |
| 2,925,340 | 2/1960 | Bryce et al. | 96/83 |
| 3,364,024 | 1/1968 | Yackel et al. | 96/76 R |
| 3,369,903 | 2/1968 | Harvey | 96/83 |
| 3,380,831 | 4/1968 | Cohen et al. | 96/115 R |
| 3,518,087 | 6/1970 | Yackel et al. | 96/83 |
| 3,607,264 | 9/1971 | Celeste et al. | 96/28 |
| 3,639,123 | 2/1972 | Gray | 96/28 |
| 3,661,576 | 5/1972 | Crary | 96/115 P |
| 3,718,473 | 2/1973 | Gervay et al. | 96/83 |
| 3,753,715 | 8/1973 | Klopllel | 96/115 P |
| 3,754,920 | 8/1973 | Kuchta | 96/28 |
| 3,770,438 | 11/1973 | Celeste | 96/28 |
| 3,775,113 | 11/1973 | Bonham et al. | 96/28 |
| 3,778,272 | 12/1973 | Hepher | 96/83 |
| 3,782,939 | 1/1974 | Bonham et al. | 96/28 |
| 3,794,546 | 2/1974 | Cohen et al. | 96/28 |

FOREIGN PATENT DOCUMENTS 1441982 7/1976 United Kingdom .

OTHER PUBLICATIONS

"Image Transfer Material", *Research Disclosure* No. 15513 3/1977.

*Primary Examiner*—Richard L. Schilling

*Attorney, Agent, or Firm*—Cruzan Alexander; Donald M. Sell; Gerald F. Chernivec

[57] ABSTRACT

A presensitized photographic speed light sensitive sheet structure suitable for producing a dry transfer element, comprising a substrate having a release coating thereon, and overlying the release coating a photo-sensitive layer comprising a silver halide emulsion. After light exposure to an original and development, the remaining silver image portions have a greater adhesion for a receptor surface when applied thereto under pressure than the adhesion of the indicia to the substrate under like pressure.

4 Claims, No Drawings

PHOTOGRAPHIC SPEED TRANSFER ELEMENT WITH OXIDIZED POLYETHYLENE STRIPPING LAYER

Background of the Invention

This invention relates to image transfer processes and elements used therein. More particularly, the invention relates to a light sensitive photographic element which, after imagewise exposure and removal of non-image areas, can be utilized as a transfer element whereby individual image areas can be transferred to a receptor surface.

Dry transfer sheets typically consist of a support, preferably transparent, carrying thereon indicia such as letters, numerals, or other symbols which can be individually transferred to a receptor surface, such as a sheet of paper. Transfer occurs by application of rubbing pressure to the backside of the support while the individual image or indicia contained on the support is in contact with the receptor, followed by peeling away the support, whereupon the image adheres to the receptor surface.

One conventional technique for manufacturing dry transfer sheets at the present time is to screen print indicia on a support. Such manufacture is costly and complex, generally being undertaken only by experts in the field. For each of the numerous indicia which might be required in practice, a separate screen stencil is necessary, thereby economically limiting the manufacture to larger quantities of indicia having the greatest utility in the field. The cost of providing small numbers of special-purpose indicia for individual uses is therefore prohibitive.

Recently, transfer elements utilizing light sensitive systems have been disclosed. In U.S. Pat. No. 3,671,236, a method for photomechanically producing multi-colored images on a single substrate is disclosed. In that disclosure, the entire light sensitive diazo resin-based layer is transferred from a carrier sheet to a receptor prior to imagewise exposure thereof. Imaging and development is undertaken subsequent to transfer. There is no disclosure of transferring individual indicia comprising only the light exposed areas of the transfer element. Additionally, the light sensitive system therein is based on a diazo resin as opposed to silver halide photographic systems.

Photopolymerizable or crosslinkable materials have been utilized in image transfer, typically based on the fact that a differential degree of surface tack exists between unexposed and exposed areas of a photopolymer system, such as are disclosed in U.S. Pat. Nos. 3,342,593 and 3,202,508.

Assignee's copending application Ser. No. 680,666 discloses a dry transfer sheet utilizing a photopolymer system whereby light polymerizes a section of the coating corresponding to the clear portions of a negative mask. The polymerized areas remain on the film base while the unexposed areas are removed during development. The polymerized image areas can then be transferred to receptors in a manner similar to printed dry transfer sheets. Another system which functions in a similar manner is disclosed in British Pat. No. 1,441,982.

The disadvantages of the foregoing systems is that they require high intensity ultraviolet light sources for imaging; the maximum achievable density is limited by pigment absorption of the light. Furthermore, they always require a negative mask. The production of this negative mask often requires a time consuming camera operation and additional expense. It is therefore desirable to provide a system having a capability such that the negative intermediate may be eliminated if desired.

Alternative methods of transferring images, wherein less intensity light is necessary, utilize a gelatin/silver halide emulsion. U.S. Pat. Nos. 2,596,756; 2,716,059; and 3,311,472 disclose the transfer of part of an image by pressing the wet imaged sheet in contact with a receptor, usually paper, and peeling away the carrier with most of the image remaining on the carrier. This system is most useful as a copying system and is not intended to produce high quality images. Furthermore, the transferred image is usually not of sufficient density to block out previous images.

U.S. Pat. No. 3,778,272 is a refinement of a well known system whereby the wet, processed sheet is pressed into contact with a receptor and allowed to dry. The gel, once dried, then has more affinity for the receptor than the carrier, such that upon removal of the carrier, the image is retained by the receptor. This system is usually not acceptable because it is often not possible or desirable to wet the receptor and is further limited by the necessary drying time of the wet gel. Such a system also does not allow transfer of individual characters or indicia.

In contrast to the aforementioned transfer systems, our invention requires low levels of light for imaging, similar to other silver halide systems, and further has the advantage of providing for individually transferrable indicia to a receptor in the dry state.

Summary of the Invention

In accordance with the invention, there is provided a photographic sheet structure suitable for producing a dry transfer element, comprising a thin, flexible carrier substrate having a release coating thereon, and overlying said release coating and releasably bonded thereby to said substrate a photosensitive layer comprising a silver halide emulsion, the photosensitive layer, after imagewise exposure thereof, development with a tanning developing agent, and removal of the soluble portions of the layer, having greater adhesion to a receptor surface when applied thereto under pressure, than the adhesion of the photosensitive layer to the carrier substrate.

Detailed Description of the Invention

The basic components of the light-sensitive transfer element of our invention include a thin, flexible, film support, a release coating on the support, and a silver halide emulsion overlayer.

The film support is preferably transparent since it is desirable to allow visual positioning of individual indicia for transfer to a receptor, and exposure can then be undertaken through the backside of the transfer element, i.e., through the support itself. The support should be sufficiently thin and flexible to allow transfer by stylus pressure. Typical thin, flexible, film supports include polyesters, polypropylene, polyethylene, polystyrene, triacetate and transparent paper, i.e., glassine base, coated with a non-porous mterial such as cellulose acetate or polycarbonate.

The release layer acts essentially as a barrier to prevent the silver halide overlayer from firmly bonding to the transparent film support. Additionally, the release layer must be capable of retaining the tanned gelatin areas of the silver halide overlayer during image development, yet allow release of these same areas from the film support during image transfer. Furthermore, the release layer acts as a primer to allow coating of silver halide emulsions on supports not normally receptive to such coatings, e.g., polyethylene and polystyrene. Therefore, the release layer under the image areas cannot dissolve or otherwise be removed during the imaging process. Such can be accomplished in a variety of ways, examples of which are: providing a very thin release layer, thereby minimizing processing impact thereon; providing a release which can be hardened in connection with the image areas during processing, e.g., a gelatin blend with Vydax WD, a commercially availabe telefluoromer dispersion in Freon TF from DuPont; and utilizing a release material which is insoluble in the developer or wash water.

For image transfer to occur by proper functioning of the release layer, the bond between the image layer and the film support must fail during transfer by one of the following mechanisms: (1) adhesive failure at the release layer-film support interface; (2) adhesive failure at the image layer-release layer interface; or (3) cohesive failure within the release layer.

Mechanism (1) results from release materials which have low adhesion for the film support, are capable of forming a bond with the image layer, and have internal strength which is greater than the bond strength between the release layer and the support. An exemplary material is a mixture of gelatin and Paracol 404C, tradename for an aqueous 47 percent solids wax emulsion, commercially available from Hercules.

In order for release of this type to function for individual character transfer, the release film must fracture around the image during transfer, thus allowing the image to be adhered to the receptor without transferring unwanted parts of the image. The general method of controlling the fracturability of the film is by controlling film thickness and composition. Fillers, surfactants, plasticizers or film treatments such as corona treatment or flame treatment can be used to control the adhesion of the coating to the film support.

Mechanism (2), adhesive failure at the image layer-release layer interface, results when the release layer has greater adhesion for the film support than for the image layer. This result is generally attained by utilizing release materials having low surface energies, thereby resulting in poorer wetting by the image layer, and/or which are insoluble in the solvents utilized in coating the image layer. An exemplary material exhibiting such characterisitics is a mixture of gelatin and polyethylene. Silicone resins, fluorochemical resins and solvent-soluble polymers such as polyurethanes also have utility herein.

Cohesive failure of the release layer, mechanism (3), results when the release material has a low internal strength, i.e., lower than either the silver halide layer/release layer bond or the release layer/substrate bond. Commerically available mold release agents such as Vydax AR, tradename for a telomer of tetrafluoroethylene, and Mold Wiz PS-9, tradename for a commerical mold release agent, believed to comprise a silicone, hydrocarbon, and carboxylate salt blend, are exemplary.

The preferred release layer is that which has the greatest capability of preventing a significant increase in adhesion of the developed (and therefore hardened) silver halide emulsion to the support after image development. Since materials exhibiting cohesive failure do not take part in image development, but function based solely on the release layer formulation itself, they are preferred.

The photographic emulsion having utility herein typically contains a substantially unhardened colloid binder that is commonly used for obtaining relief images. Such an emulsion can be either negative or positive acting and can be of any conventional composition such as silver chloride, silver chlorobromide, silver iodobromide, etc. In this instance, the binder must be capable of being tanned or hardened when contacted by an oxidizing developer. A positive emulsion having utility herein is described by P. J. Hillson in U.S. Pat. No. 2,062,651.

Another photographic system having utility herein is disclosed in a patent application of Rutledge, commonly assigned and filed of even date herewith, application Ser. No. 904,546. There is disclosed therein a process for obtaining colloid relief images in a tannable colloid layer adjacent the silver halide emulsion layer. The emulsion layer contains a substituted gelatin therein which is resistant to tanning, such that the complete silver halide emulsion layer may be removed subsequent image development, the image being maintained in the tanned adjacent colloid layer.

The layer farthest from the backing must possess the characteristics that, after processing, the remaining image area can be caused to adhere to a receptor in the dry state. The adhesion to the receptor can be effected by heat, pressure, or both, but the imaged sheet should be dry before the transfer is undertaken. After the image area is adhered by use of simple stylus pressure to the receptor, the carrier sheet can be peeled away and the image area remains on the receptor.

Adhesion is preferably enhanced by including in the layer that will be contacted with the receptor an adhesive material that can be activated by pressure or heat. Typical adhesive materials are Daratak 74 L, tradename for an adhesive disclosed in U.S. Pat. No. 3,275,589 and available from W. R. Grace Co., or an emulsified blend of 90 percent solids isooctyl acrylate and 10 percent solids acrylic acid. Such adhesive materials should be compatible with the layer in which they are included.

The adhesive may be included in the silver halide emulsion or may be incorporated in a separate overlayer, typically containing a binder, e.g., gelatin.

The adhesive concentration should not be so high as to prevent normal processing. Typically, from about 15 to about 85 percent by weight of the layer can be adhesive.

It is also possible to apply an adhesive coating after the photographic layer has been developed and the relief image formed. This is generally less desirable because it requires additional processing time and leaves adhesive in the non-image areas.

In addition, it may be desirable to overcoat the adhesive layer with a non-tacky water or base-soluble polymer so that the material may be handled during manufacture and other operations prior to processing without premature sticking.

Development of the image is conventionally accomplished by converting the silver halide to metallic silver with any of the well known solutions for tanning development. The developer should be a tanning developer, e.g., pyrogallol or hydroquine, so that, in addition to developing the silver, the developer will harden the gelatin near the developed silver grain. For reversal systems, such as disclosed in U.S. Pat. No. 1,525,766, the first developer develops the silver but does not harden the gelatin while the second developer fogs the remaining silver halide and then crosslinks the binder. The developers can be in solution, incorporated in the emulsion, in a layer next to the emulsion, or incorporated in a sheet that is contacted with the emulsion during processing. All these systems have been well described in patents and literature. Such disclosures are, for example, U.S. Pat. Nos. 3,364,024; 3,419,395; 3,639,126; 3,600,177; 3,297,445; 3,650,749; and 3,516,829.

In addition, numerous systems have been recently disclosed that aid in the imaging process by altering for example, contrast, development, and speed. Other systems disclose anti-oxidants or methods for reducing oxidation, and stabilizers or other additives to improve shelf life. Such disclosures can be applied to our transfer system as described and can be found in patents such as U.S. Pat. Nos. 3,295,978; 3,293,035; 3,300,307; 3,372,031; and 3,293,035. Several polymeric binders such as those described in U.S. Pat. Nos. 3,721,565 and 3,681,079 may also provide desirable characteristics and can be added. For example, such polymeric materials typically reduce moisture sensitivity, provide better film properties for the unprocessed sheet as well as the individual transferrable characters, assist in processing speed, contrast, shelf life, etc.

Our invention will be further illustrated by the following non-limiting examples, wherein all parts are by weight unless otherwise specified.

EXAMPLE 1

A solution was formulated for use as a release coating as follows:

| | |
|---|---|
| 1500 gms | 1,1,1,trichloroethane |
| 1500 gms | Freon TF, tradename for DuPont's trichlorotrifluoroethane |
| 1000 gms | Vydax AR, tradename for a telomer of tetrafluoroethane, available from DuPont |
| 150 gms | Isopropanol |

The solution was extrusion coated on 3 mil corona discharge-treated polyester film and dried at 120° F. to provide a dry coating weight of 50 milligrams per square foot.

Coating weights of the release layer can typically range from about 20 to about 130 milligrams per square foot. Increased coating weights result in easier image release in product end use, but there is a tendency for image loss during processing. Lower coating weights provide improved adhesion of the emulsion layer(s) during normal handling and processing of the product but consequently are more difficult to transfer. Preferred coatings weights are from about 35 to about 75 milligrams per square foot.

The release layer was then overcoated by slot coating with a substantially unhardened conventional negative-acting silver chlorobromide emulsion and dried. The dry coating weight of the emulsion provided 2.0 grams per square meter of silver and 2.0 grams per square meter of gelatin.

After the silver halide emulsion was dried, it was overcoated with the following adhesive layer:

| | |
|---|---|
| 1475 gms | Water |
| 66 gms | PL-1443 Gelatin, commercially |

-continued

| | |
|---|---|
| | available from Leiner |
| 659 gms | of a 22 percent solids aqueous emulsion of a copolymer of 90 percent isooctyl acrylate, 10 percent acrylic acid adhesive |
| 4 gms | DB-31, a Dow Chemical antifoam |

The gelatin and water were heated slowly to 40° C., after which the other components were added and mixed. The adhesive coat was then applied via slot coating to a dry coating weight of 3.0 grams per square meter.

After drying the adhesive layer, the sheet can be exposed using conventional silver halide exposure equipment, i.e., camera, enlarger, contact frame with point light source, projectors, etc. This sample was exposed for 0.7 foot candle-seconds.

The exposed sample was then developed for 45 seconds at 20° C. in a conventional photographic tanning developer comprising:

| | |
|---|---|
| 32 gms | Potassium Hydroxide |
| 24 gms | Sodium Sulfite |
| 4 gms | Sodium Bromide |
| 12 gms | Catechol |
| 6 gms | Hydroquinone |
| 2 gms | Citric Acid |
| Deionized water to make 4 liters | |

After removing the sample from the developer, the sheet was immediately washed with warm (100° F.) water. This step washed away the unhardened areas in both the image and the adhesive layers.

After air drying of the processed sheet, the resultant images were transferred to a wide variety of substrates using simple stylus pressure.

EXAMPLE 2

A photosensitive element was prepared and exposed as per Example 1 and developed in Kodak Tanning Developer (a commercially available two-part system) for 45 seconds and then washed as per Example 1. The result was a dry transfer sheet with the same effectiveness for transfer as Example 1.

EXAMPLE 3

A substantially unhardened conventional direct positive chlorobromide emulsion was coated on the release layer of Example 1 to provide a silver coating weight of 2.4 grams per square meter and a gelatin coating weight of 3.0 grams per square meter.

The positive emulsion was then overcoated with the gelatin/adhesive layer as per Example 1.

After exposure as per Example 1, the sheet was processed in a tanning developer as defined in Example 1 for 45 seconds at 20° C. After development, the exposed areas of the image layer and the gelatin/adhesive layer were washed away with warm water. When air dried, the image transferred to a variety of substrates via conventional stylus pressure.

EXAMPLE 4

A release layer coating solution was prepared by mixing the following:

| | |
|---|---|
| 35 gms | Vydax AR |

-continued

| | |
|---|---|
| 20 gms | Nalco D1724, a colloidal silica dispersion in methyl cellosolve from Nalco Chemical Co. |
| 165 gms | Freon TF |

A 3 mil corona treated polyester film was then knife coated with the above solution and dried for 2 minutes at 180° F., to a dry coating weight of 0.25 grams per square foot. This release layer was then overcoated with the silver halide emulsion described in Example 1.

When the emulsion was dry, a camera exposed sheet was processed for 45 seconds in the developer in Example 1 and unexposed areas were washed away with warm water. When dried, the imaged sample was adhesive coated with 3M Brand No. 77 Spray Adhesive, tradename for a polymeric acrylate pressure sensitive adhesive. Image transfer to paper, etc. was obtained with stylus pressure.

EXAMPLE 5

A release layer solution was prepared by mixing:

| | |
|---|---|
| 10 gms | Nalco 2600, a 57 percent solids colloidal suspension of discrete, organically coated particles in an oil carrier from the Nalco Chemical Co. |
| 20 gms | Toluene |

The solution was knife coated at 1.5 mil wet thickness on corona treated 3 mil polyester film. The coating was then dried for ten minutes at 200° F.

The release coating was then overcoated with the silver halide emulsion described in Example 1. When the emulsion was dry, a camera exposed sample was processed in a developer as described in Example 1 for 45 seconds and unexposed areas were washed away with warm water.

When the imaged sample was dry, the adhesive of Example 4 was applied to the surface. Image transfer was attained with stylus pressure.

EXAMPLE 6

A release layer was obtained by coating the following solution at a wet thickness of 1.5 mils on 3 mil corona primed polyester and drying for 3 minutes at 180° F.:

| | |
|---|---|
| 20 gms | Nalco 1050, a 50 percent solids aqueous colloidal silica dispersion from the Nalco Chemical Co. |
| 30 gms | Deionized water |

The release coating was overcoated with the silver halide emulsion described in Example 1. The dried sample was then imaged as described in Example 3.

When the spray adhesive of Example 4 was applied to the dry imaged sheet, image transfer was attained with stylus pressure.

EXAMPLE 7

A release layer solution was prepared as follows:

| | |
|---|---|
| 30.6 gms | Vydax AR |
| 114.4 gms | PS 259, tradename for a proprietary blend of silicone wax and polyethylene oxide, commercially available from Axel Plastic Co. |
| 342.0 gms | Dichloromethane |

The solution was extrusion coated on 3 mil corona primed polyester film and dried at 120° F. to a coating weight of 85 milligrams per square foot.

The release layer was then overcoated with the following adhesive-containing silver halide emulsion:

| | |
|---|---|
| 20 ml | Emulsion described in Example 1 |
| 2 gm | Daratak 74L (W. R. Grace), tradename for an adhesive disclosed in U.S. Pat. No. 3,275,589 |
| 2 gm | Deionized water |

After the emulsion was dried, a sample was exposed and processed as described in Example 1. When the sample was dry, image transfer was readily attained with normal stylus pressure.

EXAMPLE 8

The release layer as described in Example 1 was overcoated with a polymer-containing silver halide emulsion prepared as follows:

| | |
|---|---|
| 2.4 gms | Polyethylene acrylate homopolymer |
| 20.0 mls | Silver halide emulsion of Example |

The dried coating was imaged and processed as described in Example 1. When the image was adhesive coated with a 3M Brand No. 77 Spray Adhesive, image transfer was easily attained with stylus pressure.

EXAMPLE 9

A structure utilizing the release layer and emulsion of Example 1 was overcoated with the following adhesive-containing emulsion:

| | |
|---|---|
| 20 mls | Silver halide emulsion of Example 1 |
| 2 gms | Daratak 74L |

The dry coatings were camera exposed and processed in the developer of Example 1 for 45 seconds at 20° C. Unexposed areas were washed away with warm water. When the sample was dry, the image was readily transferred to a receptor with stylus pressure.

EXAMPLE 10

The same structure as that of Example 1 was exposed, developed, and washed with warm water as per Example 1 to thereby provide image areas. The silver image areas were then bleached by dipping the construction for 30 seconds in a solution containing, by weight, 6.5 percent potassium ferricyanide, 6.5 percent potassium bromide, and 87 percent water. The sheet was then rinsed with 70° F. water for 15 seconds.

The image areas were then fixed conventionally by treating same with 3M Liquid Lith Fix, tradename for a conventional silver halide fixer, rinsed with 70° F. water for 5 minutes, and air dried.

A dye solution was prepared by mixing 5 parts of American Hoechst Lana Perl Brill Red B, a water-soluble red dye, with 95 parts water, after which the solution was swabbed onto the image areas, the image rinsed with water and dried.

In this manner a colored image was prepared which transferred to receptors under stylus pressure.

EXAMPLE 11

A dispersion of oxidized polyethylene was mixed with a melted crosslinkable gelatin solution to provide 10 parts polyethylene per part gelatin on a dry basis. The resulting solution was knife coated on a 3 mil corona treated polyester film and dried at 140° F. to provide a dry coating weight of 50 milligrams per square foot.

Over this layer was slot coated a negative acting chlorobromide photographic emulsion containing 130 grams tannable gelatin per mole of silver. An anionic surfactant, Rohm & Haas' Triton 770, at 0.1 percent by weight of solution, was added to improve wetting. The coating weight was approximately 1.4 grams of silver per square meter. This was overcoated with the same emulsion to which had been added 345 grams of Daratak 74L (55 percent solids) emulsion per gram mole of silver. The coating weight of this layer was also 1.4 grams of silver per square meter.

The coated sheet was selectively exposed to light in an enlarger camera, developed with the tanning developer of Example 1, and then washed with a stream of warm (40° C.) water. The imaged sheet was then dried and transferred similar to previous examples. Release in this instance was primarily between the release layer and the first emulsion layer, but some cohesive failure was also noted.

EXAMPLE 12

In place of the first emulsion layer from Example 11, a layer consisting of one part of dispersed carbon black and five parts hardenable genatin was knife coated at 1.8 grams per square meter dry coating weight. After the material was imaged, the pigment was seen to supplement the image density.

If a colored pigment is utilized, the silver image areas can be removed with a bleach and fix system to yield colored image areas. Two pigment layers could be used for color enhancement or special applications.

Furthermore, to minimize coloration in background areas due to the pigmented layer adhering to the release layer, a clear gelatin layer can be interposed between the release layer and the pigmented layer(s).

EXAMPLE 13

In place of the negative chlorobromide emulsion of Example 12, a positive chlorobromide emulsion was used. The result was a positive-to-positive image when exposed in a camera.

EXAMPLE 14

Example 11 was duplicated with the exception that in place of the release layer, the following solution was prepared and knife coated at a dry coating weight of 0.13 gram per square meter:

| | |
|---|---|
| 10 percent Hardenable Gelatin PL 1443 (P. Leiner Co.) | 200 g |
| 10 percent soluble silver protein | 1.34 ml |
| 2 percent nickel acetate | 54 ml |
| 2 percent sodium mono sulfide | 47 ml |
| 25 percent Triton 770 | .8 ml |

The release layer should be allowed to cure for several days at room temperature after the material is coated.

When processed as per Example 11, similar results are obtained.

EXAMPLE 15

A layer of high density oxidized polyethylene and gelatin was applied to a corona treated polyester as per Example 11. Over this was applied a layer coated from the following solution:

| | |
|---|---|
| 5.3 g | LX380 (30 percent solids), tradename for an aqueous dispersion of high density polyethylene, available from Petrolite Corp. |
| .8 g | Nalco 1050 colloidal silica |
| 393.9 g | Water |

This was knife coated and dried at 90° F. to provide 2.8 grams per square meter dry weight. This layer was then overcoated with the following solution:

| | |
|---|---|
| 10 percent Hardenable Gelatin PL 1443 (P. Leiner Co.) | 66 g |
| 10 percent soluble silver protein | .44 ml |
| 2 percent nickel acetate | 17.8 ml |
| 2 percent sodium mono sulfide | 15.5 ml |
| 25 percent Triton 770 (Rohm & Haas) | .26 ml |
| Water | 25.5 g |
| Daratak 74L (adhesive dispersion) | 25.5 g |

Following drying at 90° F., the dry coating weight was 2.4 grams per square meter. This layer was then imaged by the conventional two sheet diffusion transfer process. With this process an emulsion usually containing a developer is coated on a separate sheet, typically called the donor. The donor was exposed by conventional methods, immersed in a caustic solution containing sodium thiosulfate, a silver solvent, and then contacted for 60 seconds with the coated sheet of our invention. Silver transfer occurred and the gelatin was tanned in these same areas. The sheet was washed with warm water after the donor was removed. The resulting image was dry transferrable.

EXAMPLE 16

The following solution was prepared:

| | |
|---|---|
| 0.2 g | Leiner 1443 Photographic Gelatin |
| 96 g | Water (at 40° C.) |
| 3.8 g | Paracol 404C (a 47 percent solids wax emulsion available from Hercules) |

This was coated by extrusion and dried at 100° F. to yield a dry coating weight of 96 milligrams per square foot.

This was overcoated with the photographic emulsions described in Example 11.

The sample was exposed to a negative and developed for 30 seconds in the following solution:

| | |
|---|---|
| 2.0 g | Hydroquinone |
| 1.0 g | Catecol |
| 2.0 g | Anhydrous sodium sulfite |
| 0.5 g | Sodium bromide |
| 1.0 g | Citric acid |
| 25.0 g | Sodium metasilicate |

-continued

| |
|---|
| Water to 1 liter |

It was then washed with water at 110° F., dried, and image areas were transferred with stylus pressure.

EXAMPLE 17

The following solution was prepared:

| | |
|---|---|
| 0.4 g | Leiner 1443 Gelatin |
| 394.3 g | Water (at 40° C.) |
| 5.3 g | Blend of a 1:1 ratio or oxidized polyethylene and paraffin (30 percent solids emulsion) |

This was slot coated to a dry coating weight of 12 milligrams per square foot.

It was then overcoated and processed as per Example 16, whereupon similar results were obtained.

EXAMPLE 18

A release solution was prepared in the following manner:

First, 250 g Vydax WD, tradename for a telefluoromer dispersion in Freon TF, and 250 g water were placed in a rotary vacuum evaporator and evaporated until the total net weight was 250 grams.

Then, 100 g Cabot 300R Carbon Black, from the Cabot Corp., 40 g Tamol 731, a dispersing agent from Rohm & Haas, and 860 g water were ball milled until individual pigment particles were no longer visible under 60 power magnification.

Next, 200 g of the solution prepared in step 1, 200 g of the solution prepared in step 2, and 400 g 10 percent melted gelatin in water (PL-1443-P. Leiner Co.) were mixed, and the solution was slot coated on 3 mil polyester at 27 milliliters per square meter and dried at 90° F.

This layer was overcoated with an iodobromide emulsion that contained 150 g tannable gelatin and 188 g solid Daratak 74L per mole of silver. Triton 770 was added at a level of 0.1 percent by weight to aid in wetting. The silver coating weight was approximately 2.0 grams per square meter. The resultant sheet was exposed, processed and transferred in the same manner as Example 16.

EXAMPLE 19

The release layer of Example 11 was overcoated with the following solution:

| | |
|---|---|
| 20 g | PL 1443 Gelatin |
| 4 g | FC 152, a fluorochemical surfactant from 3M Co. |
| water to make 1 liter | |

The solution was maintained at 35° C. and coated at 20 milliliters per square meter, followed by drying at 90° F.

This layer was then overcoated with a solution prepared as follows:

| | |
|---|---|
| Step 1 | Combine: |
| | 15 g Indo Brilliant Scarlet #6335 (Harmon Colors Corp.) |
| | 1.5 g Daxad 11, a dispersing agent from W. R. Grace Co. |

-continued

| | |
|---|---|
| | 83.5 g Water |

The mixture was ball milled until individual pigment clumps were no longer visible under 60 power magnification.

| | |
|---|---|
| Step 2 | Combine: |
| | 10 g PL 1443 Gelatin |
| | 590 g Water |
| | 30 g Daratak 74L |
| | 30 g Solution from Step 1 |
| | 2 ml FC 152 surfactant |

The resulting solution was heated to 35° C., coated at 25 milliliters per square meter, and dried at 90° F.

This layer was then overcoated with a dye-sensitized chlorobromide emulsion containing 130 g phthalated gelatin per mole of silver. FC 152 was added at a level of 0.7 percent by weight of the solution to aid in wetting. The emulsion was coated at 2.4 grams silver per square meter and dried at 90° F.

The resulting sheet was selectively exposed as in the previous examples and processed in the following solutions:

| | |
|---|---|
| Solution A: | 5 g Ascorbic Acid |
| | 40 g Hydroquinone |
| | 4 g p-methylaminophenol sulfate |
| | 2 g sodium bromide |
| | 50 g sodium sulfate |
| | Water to 1 liter |

Development was effected by using a stabilization processor containing two dip stations with a nip roll following each station. Total dwell time in the processor was 5 seconds with Solution A in the first station and Solution B in the second station. Following exit from the processor, the sheet was held for thirty seconds and then washed with water at 55° C. The sample, when dry, had red image areas which were transferrable with stylus pressure.

What is claimed is:

1. A photographic sheet material suitable for producing a dry transfer element, comprising a thin, flexible carrier substrate having a release coating thereon, said release coating comprising oxidized polyethylene, and overlying said release coating and releasably bonded thereby to said substrate a photosensitive layer comprising a silver halide emulsion, said photosensitive layer, after imagewise exposure thereof, development with a tanning developing agent and removal of the soluble portions of said layer, having greater adhesion to a receptor surface when applied thereto under pressure than the adhesion of said photosensitive layer to said carrier substrate under like pressure.

2. A photographic sheet material suitable for producing a dry transfer element, comprising a thin, flexible carrier substrate having a release coating thereon, said release coating comprising oxidized polyethylene, and overlying said release coating and releasably bonded thereby to said substrate a first layer comprising a colloidal material capable of being tanned when contacted with oxidized silver halide developers, and overlying said first layer a second layer comprising a photographic silver halide emulsion.

3. A sheet material containing dry transferrable image areas thereon, said sheet structure comprising a thin, flexible carrier substrate having a release coating thereon, said release coating comprising oxidized polyethylene, and overlying said release coating and releasably bonded thereby to said carrier substrate, image areas comprising a pressure sensitive adhesive and a silver halide emulsion which has been exposed and developed with a tanning development agent, said image areas having greater adhesion to a receptor surface when applied thereto under pressure than the adhesion of said image areas to said carrier substrate under like pressure.

4. A sheet material containing dry transferrable image areas thereon, said sheet structure comprising a thin, flexible carrier substrate having a release coating thereon, said release coating comprising oxidized polyethylene, and overlying said release coating and releasably bonded thereby to said carrier substrate, image areas comprising pigmented hardened colloidal material, said colloidal material having been hardened tanning with an oxidized silver halide developer, said image areas having greater adhesion to a receptor surface when applied thereto under pressure than the adhesion of said image areas to said carrier substrate under like pressure.

* * * * *